(12) United States Patent
Zimmanck et al.

(10) Patent No.: US 10,516,270 B2
(45) Date of Patent: Dec. 24, 2019

(54) METHOD AND APPARATUS FOR COORDINATION OF GENERATORS IN DROOP CONTROLLED MICROGRIDS USING HYSTERESIS

(71) Applicant: Enphase Energy, Inc., Petaluma, CA (US)

(72) Inventors: Donald Richard Zimmanck, Petaluma, CA (US); Martin Fornage, Petaluma, CA (US); Michael J. Harrison, Petaluma, CA (US); Christopher Rowe, Old Bar (AU)

(73) Assignee: Enphase Energy, Inc., Petaluma, CA (US)

( * ) Notice: Subject to any disclaimer, the term of this patent is extended or adjusted under 35 U.S.C. 154(b) by 306 days.

(21) Appl. No.: 15/398,110

(22) Filed: Jan. 4, 2017

(65) Prior Publication Data

US 2017/0194792 A1    Jul. 6, 2017

Related U.S. Application Data

(60) Provisional application No. 62/275,380, filed on Jan. 6, 2016.

(51) Int. Cl.
*H02J 1/00* (2006.01)
*H02J 3/00* (2006.01)
(Continued)

(52) U.S. Cl.
CPC ............... *H02J 3/383* (2013.01); *H02J 3/24* (2013.01); *H02J 3/32* (2013.01); *H02J 3/46* (2013.01);
(Continued)

(58) Field of Classification Search
CPC ...... H02J 3/383; H02J 3/32; H02J 3/24; H02J 13/002; H02J 3/46; H02J 13/0075;
(Continued)

(56) References Cited

U.S. PATENT DOCUMENTS

2009/0063065 A1    3/2009   Weekly
2010/0085035 A1*   4/2010   Fornage ............. G01R 19/2513
                                                            324/76.12
(Continued)

OTHER PUBLICATIONS

Pogaku et al., "Modeling, Analysis and Testing of Autonomous Operation of an Inverter-Based Microgrid", IEEE Transactions on Power Electronics, vol. 22, Issue 2, pp. 613-625, Mar. 2007.
(Continued)

*Primary Examiner* — Richard Tan
(74) *Attorney, Agent, or Firm* — Moser Taboada; Alan Taboada

(57) ABSTRACT

A method and apparatus for autonomously operating a microgrid power generator. In one embodiment, the method comprises obtaining a first measurement of at least one grid parameter of a microgrid transmission line coupled to a power generator in a microgrid; comparing the first measurement to a turn-on threshold; initiating, when the first measurement is less than the turn-on threshold, power generation by the power generator; obtaining, after initiation of the energy generation, a second measurement of the at least one grid parameter of the microgrid transmission line; comparing the second measurement to a shut-down threshold that is greater than the turn-on threshold; and stopping, when the second measurement exceeds the shut-down threshold, the power generation by the power generator.

20 Claims, 6 Drawing Sheets

(51) Int. Cl.
*H02J 3/38* (2006.01)
*H02J 3/46* (2006.01)
*H02J 3/24* (2006.01)
*H02J 3/32* (2006.01)
*H02J 13/00* (2006.01)

(52) U.S. Cl.
CPC ......... *H02J 13/002* (2013.01); *H02J 13/0075* (2013.01); *Y02E 10/563* (2013.01); *Y02E 10/566* (2013.01); *Y02E 40/72* (2013.01); *Y02E 70/30* (2013.01); *Y04S 10/123* (2013.01)

(58) Field of Classification Search
CPC ..... Y02E 10/566; Y02E 10/563; Y02E 70/30; Y02E 40/72; Y04S 10/123
USPC .......................................................... 307/84
See application file for complete search history.

(56) References Cited

U.S. PATENT DOCUMENTS

| | | |
|---|---|---|
| 2010/0138070 A1 | 6/2010 | Beaudoin |
| 2012/0313593 A1 | 12/2012 | Knueppel et al. |
| 2014/0097683 A1 | 4/2014 | Piyabongkarn et al. |
| 2014/0183961 A1 | 7/2014 | Schrock et al. |

OTHER PUBLICATIONS

Brabandere et al., "Control of Microgrids", IEEE Power Engineering Society General Meeting, pp. 8, Jun. 24-28, 2007.

Brabandere et al., "A Voltage and Frequency Droop Control Method for Parallel Inverters", IEEE Transactions on Power Electronics, vol. 22, Issue 4, pp. 1107-1115, Jul. 2007.

Sao et al., "Control and Power Management of Converter Fed Microgrids", IEEE Transactions on Power Systems, vol. 23, Issue 3, pp. 1088-1098, Aug. 2008.

Vasquez et al., "Adaptive Droop Control Applied to Voltage-Source Inverters Operating in Grid-Connected and Islanded Modes", IEEE Transactions on Industrial Electronics, vol. 56, Issue 10, pp. 4088-4096, Oct. 2009.

Iyer et al., "A Generalized Computational Method to Determine Stability of a Multi-inverter Microgrid", IEEE Transactions on Power Electronics, vol. 25, Issue 9, pp. 2420-2432, Sep. 2010.

Majumder et al., "Droop Control of Converter-Interfaced Microsources in Rural Distributed Generation", IEEE Transactions on Power Delivery, vol. 25, Issue 4, pp. 2768-2778, Oct. 2010.

Yao et al., "Design and Analysis of the Droop Control Method for Parallel Inverters Considering the Impact of the Complex Impedance on the Power Sharing", IEEE Transactions on Industrial Electronics, vol. 58, Issue 2, pp. 576-588, Feb. 2011.

Kim et al., "Mode Adaptive Droop Control With Virtual Output Impedances for an Inverter-Based Flexible AC Microgrid", IEEE Transactions on Power Electronics, vol. 26, Issue 3, pp. 689-701, Mar. 2011.

Rocabert et al., "Control of Power Converters in AC Microgrids", IEEE Transactions on Power Electronics, vol. 27, Issue 11, pp. 4734-4749, Nov. 2012.

International Search Report and Written Opinion dated Mar. 30, 2017 for PCT Application No. PCT/US2017/012326.

\* cited by examiner

METHOD AND APPARATUS FOR COORDINATION OF GENERATORS IN DROOP CONTROLLED MICROGRIDS USING HYSTERESIS

CROSS-REFERENCE TO RELATED APPLICATIONS

This application claims priority to U.S. Provisional Patent Application No. 62/275,380, entitled "Coordination of Generators in Droop Controlled Microgrids Using Hysteresis" and filed on Jan. 6, 2016, which is herein incorporated in its entirety by reference.

BACKGROUND OF THE INVENTION

Field of the Invention

Embodiments of the present disclosure relate generally to droop-operated microgrids and, more particularly, to control of generators in a droop-operated microgrid.

Description of the Related Art

A conventional microgrid generally comprises at least one energy generator, at least one energy storage device, and at least one energy load. When disconnected from a conventional utility grid, a microgrid can generate power as an intentional island without imposing safety risks on any line workers that may be working on the utility grid.

Droop control is one technique that may be used for operating energy storage and generation resources in a microgrid that is disconnected from the utility grid. When using droop control, the droop settings of each microgrid resource may be offset from one another in order to coordinate and optimize the use of the different resources. For example, for a microgrid comprising a conventional generator as well as a distributed energy resource (DER) generator and an energy storage device, the generator could be set with a lower frequency set point than the storage device so that it doesn't turn on unless the DER generator and energy from the storage device are both being fully used. However, such operation typically leads to instability as generators typically have a minimum power they need to run at and the jump in frequency once the generator turns on would lead to the generator being shut off, thereby causing a frequency drop that results in the generator being turned on again and a continuing oscillation.

Therefore, there is a need in the art for a technique for efficiently coordinating generator operation in a droop-controlled microgrid.

SUMMARY OF THE INVENTION

Embodiments of the present invention generally relate to coordinating generator operation in a droop-controlled microgrid as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
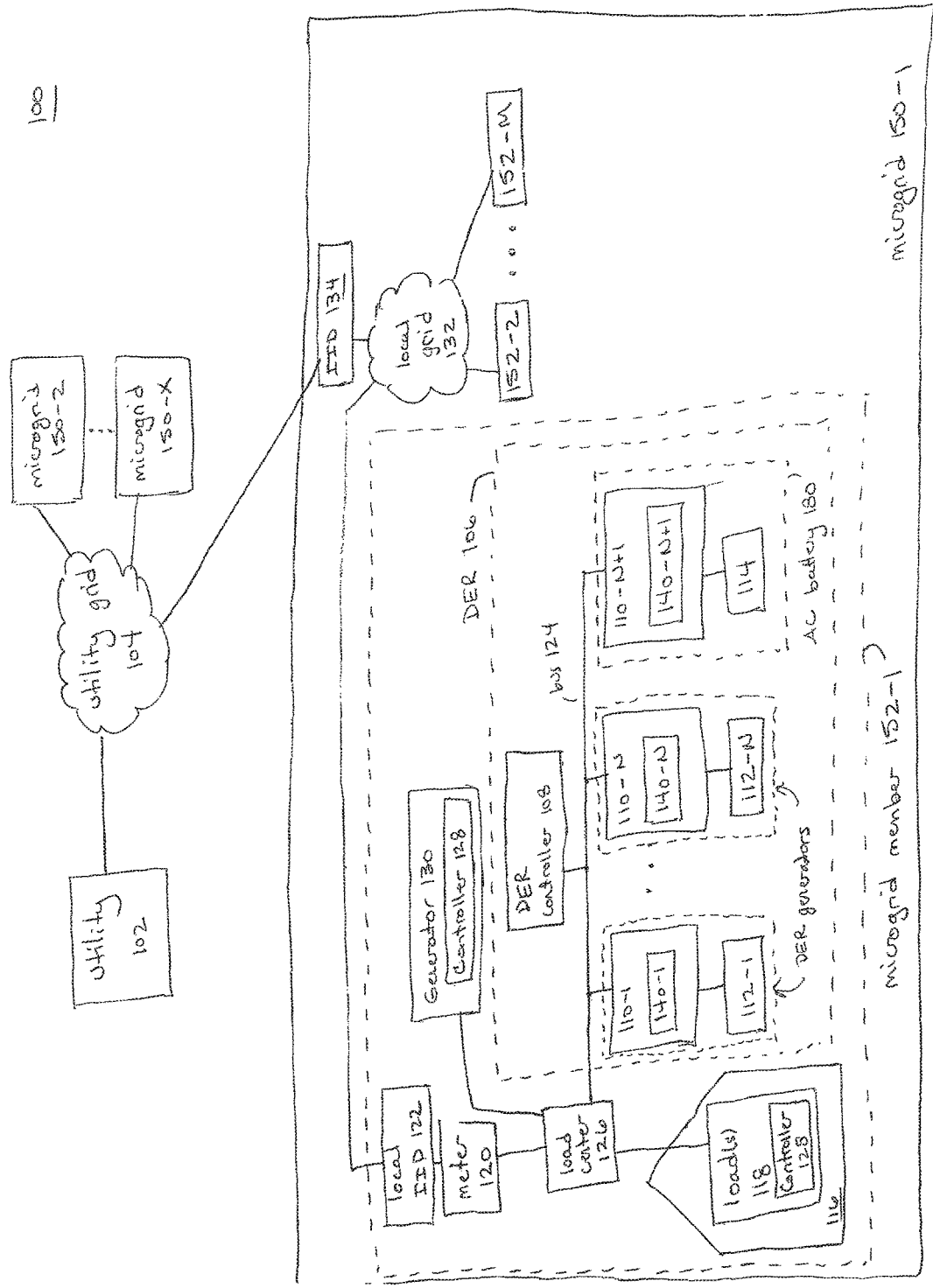
FIG. 1 is a block diagram of a power system in accordance with one or more embodiments of the present invention.

FIG. 1 is a block diagram of a power system 100 in accordance with one or more embodiments of the present invention. This diagram only portrays one variation of the myriad of possible system configurations. The present invention can function in a variety of environments and systems.

The power system 100 comprises a utility 102 (such as a conventional commercial utility) and a plurality of microgrids 150-1, 150-2, . . . , 150-X (collectively referred to as microgrids 150) coupled to the utility 102 via a utility grid 104. Through their connections to the utility grid 104, each microgrid 150 as a whole may receive energy from the utility grid 104 or may place energy onto the utility grid 104. In some communities, coupling energy to a commercial utility grid is strictly controlled by regulation and it is beneficial that the microgrids 150 maintain or strive to maintain a zero energy output policy. Each microgrid 150 is capable of operating without energy supplied from the utility 102 and may cover a neighborhood, a village, a small city, or the like, as the term "microgrid" is not intended to imply a particular system size.

Although the microgrid 150-1 is depicted in detail in FIG. 1 and described herein, the microgrids 150-2 through 150-X are analogous to the microgrid 150-1. However, the number and/or type of various microgrid components may vary among the microgrids 150.

The microgrid 150-1 comprises a plurality of microgrid members 152-1, 152-2, . . . , 152-M (collectively referred to as microgrid members 152) each coupled to a local grid 132 which in turn is coupled to the utility grid 104 via an island interconnect device (IID) 134. The local grid 132 may be a trunk of the utility grid 104 or it may be a specifically designed local grid for the microgrid 150-1.

The IID 134 determines when to disconnect/connect the microgrid 150-1 from/to the utility grid 104 and performs the disconnection/connection. Generally, the IID 134 comprises a disconnect component (e.g., a disconnect relay) along with a CPU and an islanding module and monitors the utility grid 104 for failures or disturbances, determines when to disconnect from/connect to the utility grid 104, and drives the disconnect component accordingly. For example, the IID 134 may detect a fluctuation, disturbance or outage with respect to the utility grid 104 and, as a result, disconnect the microgrid 150-1 from the utility grid 104. The IID 134 may also disconnect the microgrid 150-1 from the utility grid 104 when the microgrid 150-1 is either overproducing energy or overloading the utility grid 104. Once disconnected from the utility grid 104, the microgrid 150-1 can continue to generate power as an intentional island without imposing safety risks on any line workers that may be working on the utility grid 104. In some embodiments, the IID 134 may receive instructions from another component or system for disconnecting from/connecting to the utility grid 104.

The microgrid member 152-1 comprises a building 116 (e.g., a residence, commercial building, or the like) coupled to a load center 126 which may be within or outside of the building 116. The load center 126 is coupled to the local grid 132 via a utility meter 120 and a local IID 122, and is further coupled to a distributed energy resource (DER) 106, a generator 130, and one or more loads 118 for coupling power among these components. Although the microgrid member 152-1 is depicted in detail in FIG. 1 and described herein, the microgrid members 152-2 through 152-M are analogous to the microgrid member 152-1. However, the number and/or types of various microgrid member components may vary among the microgrid members 152.

The local IID 122 determines when to disconnect/connect the microgrid member 152-1 from/to the local grid 132 and performs the disconnection/connection. For example, the local IID 122 may detect a grid fluctuation, disturbance or outage and, as a result, disconnect the microgrid member 152-1 from the local grid 132. The IID 122 may also disconnect the microgrid member 152-1 from the local grid 132 when the microgrid member 152-1 is either overproducing energy or overloading the local grid 132. Once disconnected from the local grid 132, the microgrid member 152-1 can continue to generate power as an intentional island without imposing safety risks on any line workers that may be working on the local grid 132. The local IID 122 comprises a disconnect component (e.g., a disconnect relay) for physically disconnecting from/connecting to the local grid 132. The local IID 122 may additionally comprise a CPU and an islanding module for monitoring grid health, detecting grid failures and disturbances, determining when to disconnect from/connect to the local grid 132, and driving the disconnect component accordingly. In some embodiments, the local IID 122 may receive instructions from another component or system for disconnecting from/connecting to the local grid 132.

The meter 120 measures the ingress and egress of energy for the microgrid member 152-1; in some embodiments, the meter 120 comprises the IID 122 or a portion thereof. The meter 120 generally measures real power flow (kWh), reactive power flow (kVAR), grid frequency, and grid voltage (referred to herein as the measured parameters). In certain embodiments these measured parameters may be communicated to a microgrid monitoring system (not shown) that monitors each of the microgrid members 152.

The generator 130 is a fuel-based power generator, such as a diesel generator, that automatically increases or curtails energy output depending on the needs of the microgrid member 152-1. The generator 130 comprises one or more components for measuring grid parameters, such as grid frequency and/or grid voltage, and a component controller 128 described in detail further below with respect to FIG. 5; in some embodiments, one or more of the components for measuring the grid parameters may be part of the controller 128. The component controller 128 may optimize the operation of the generator 130 with respect to the microgrid member 152-1 and/or the microgrid 150-1 (e.g., by generating control instructions for the generator 130); implement control instructions for operating the generator 130 (e.g., instructions received from another component or system); obtain data pertaining to the generator 130 (e.g., performance data, operational data, or the like) which may further be communicated to another component or system; or perform similar functions.

The loads 118 consume energy obtained via the load center 126 and may be located inside of the building 116 or outside of the building 116. Some of the loads 118 may be "smart loads" that comprise the component controller 128 for optimizing the utilization of energy (e.g., disconnecting/connecting the smart load 118 when the grid is overloaded/underloaded, modulating operation of smart loads 118, such as HVAC, pumps, and the like, as needed); implementing control instructions for the load 118 (e.g., instructions received from another component or system); obtaining data pertaining to the loads 118 (e.g., performance data, operational data, and the like) which may further be communicated to another component or system; or performing similar functions.

One or more of the loads 118 may be an energy storage component that stores energy received via the load center 126, such as a hot water heater, an electric car, or the like. Such energy storage loads 118 may further deliver stored energy to other loads 118 and/or the local grid 132 as needed, where the energy storage and delivery is controlled by the corresponding component controller 128.

The DER 106 comprises power conditioners 110-1 . . . 110-N, 110-N+1 coupled in parallel to a bus 124 that is further coupled to the load center 126. Generally the power conditioners 110 are bi-directional power conditioners and those power conditioners 110 in a first subset of power conditioners 110 are coupled to DC energy sources 112 (for example, renewable energy sources such as wind, solar, hydro, and the like) while the power conditioners 110 in a second subset of power conditioners 110 are coupled to energy storage devices 114 (e.g., batteries, flywheels, compressed air storage, hot water heaters, electric cars, or the like). The combination of a DC energy source 112 and a corresponding power conditioner 110 may be referred to herein as a DER generator. In embodiments where the power conditioners 110 are DC-AC inverters, a power conditioner 110 and a corresponding energy storage device 114 may together be referred to herein as an AC battery 180.

In the embodiment depicted in FIG. 1, the power conditioners 110-1 . . . 110-N are respectively coupled to DC energy sources 112-1 . . . 112-N (e.g., renewable energy sources such as wind, solar, hydro, and the like) for receiving DC power and generating commercial power grid compliant AC power that is coupled to the bus 124. As further depicted in FIG. 1, the power conditioner 110-N+1 is coupled to an energy storage device 114 to form an AC battery 180. The power conditioner 110 of the AC battery 180 can convert AC power from the bus 124 to energy that is stored in the energy storage device 114, and can further convert energy from the energy storage device 114 to commercial power grid compliant AC power that is coupled to the bus 124. Although only a single AC battery 180 is depicted in FIG. 1, other embodiments may comprise fewer or more AC batteries 180.

In one or more embodiments, each DC source 112 is a photovoltaic (PV) module. In some alternative embodiments, multiple DC sources 112 are coupled to a single power conditioner 110 (e.g., a single, centralized power conditioner). In certain embodiments, the power conditioners 110 are DC-DC converters that generate DC power and couple the generated power to a DC bus (i.e., the bus 124 is a DC bus in such embodiments); in such embodiments, the power conditioner 110-N+1 also receives power from the DC bus and converts the received power to energy that is then stored in the energy storage device 114.

The DER 106 comprises a DER controller 108 that is coupled to the bus 124 and communicates with the power conditioners 110 (e.g., via power line communications (PLC) and/or other types of wired and/or wireless techniques). The DER controller 108 may send command and control signals to one or more of the power conditioners 110 and/or receive data (e.g., status information, data related to power conversion, and the like) from one or more of the power conditioners 110. In some embodiments, the DER controller 108 is further coupled, by wireless and/or wired techniques, to a master controller or gateway (not shown) via a communication network (e.g., the Internet) for communicating data to/receiving data from the master controller (e.g., system performance information and the like).

In certain embodiments, the DER controller 108 comprises the local IID 122 or a portion of the local IID 122. For example, the DER controller 108 may comprise an islanding module for monitoring grid health, detecting grid failures and disturbances, determining when to disconnect from/connect to the local grid 132, and driving a disconnect component accordingly, where the disconnect component may be part of the DER controller 108 or, alternatively, separate from the DER controller 108. In some embodiments, the DER controller 108 may coordinate with the local IID 122, e.g., using power line communications.

Each of the power conditioners 110 is a droop-controlled power conditioner such that when the microgrid member 152-1 is disconnected from the local grid 132 and/or the utility grid 104 (e.g., using the IID 122 and/or the IID 134), the power conditioners 110 employ a droop control technique for parallel operation without the need for any common control circuitry or communication between the power conditioners 110. Each of the power conditioners 110 comprises a power conditioner controller 140 (described in detail further below with respect to FIG. 3) having a droop control module for implementing the droop control techniques, thereby allowing the power conditioners 110 to share the load in a safe and stable manner.

Although the microgrid member 152-1 is depicted as having a single DER 106 in FIG. 1, in other embodiments the microgrid member 152-1 may have additional DERs. In one or more alternative embodiments, the DER 106 is absent from the microgrid member 152-1 and the microgrid member energy storage loads 118 and generator 130 employ the droop control techniques described herein.

When the microgrid member 152-1, or the entire microgrid 150-1, is disconnected from the local grid 132 and/or the utility grid 104, the microgrid member storage components (i.e., the AC battery 180, energy storage loads 118) and generation components (i.e., the DER generators, the generator 130) employ a droop technique for operation without the need for any common control circuitry or communication between the power components, where the droop settings for the components are offset from one another to coordinate and optimize the use of the different components. The microgrid member storage and generation components may employ a standard or classic volt-VAR-frequency-watt droop technique, where real power is a function of frequency only and reactive power is a function of voltage only, or any other type of droop technique which cross-couples watts, VARs, volts, and frequency using rotational transformation.

In accordance with one or more embodiments of the present invention, the droop curve for the generator 130 is a hysteretic droop curve having a shut-down frequency that is higher than the turn-on frequency, where the difference between the shut-down frequency and the turn-on frequency is greater than the expected frequency jump that occurs when the generator 130 is turned on (i.e., the frequency jump that results from the minimum operating power of the generator 130). The hysteretic droop curve allows the generator 130 to autonomously enable and disable energy generation based on one or more measured grid parameters, such as frequency, as described herein. One embodiment of the generator's hysteretic droop curve is described below with respect to FIG. 2.

Figure 2:
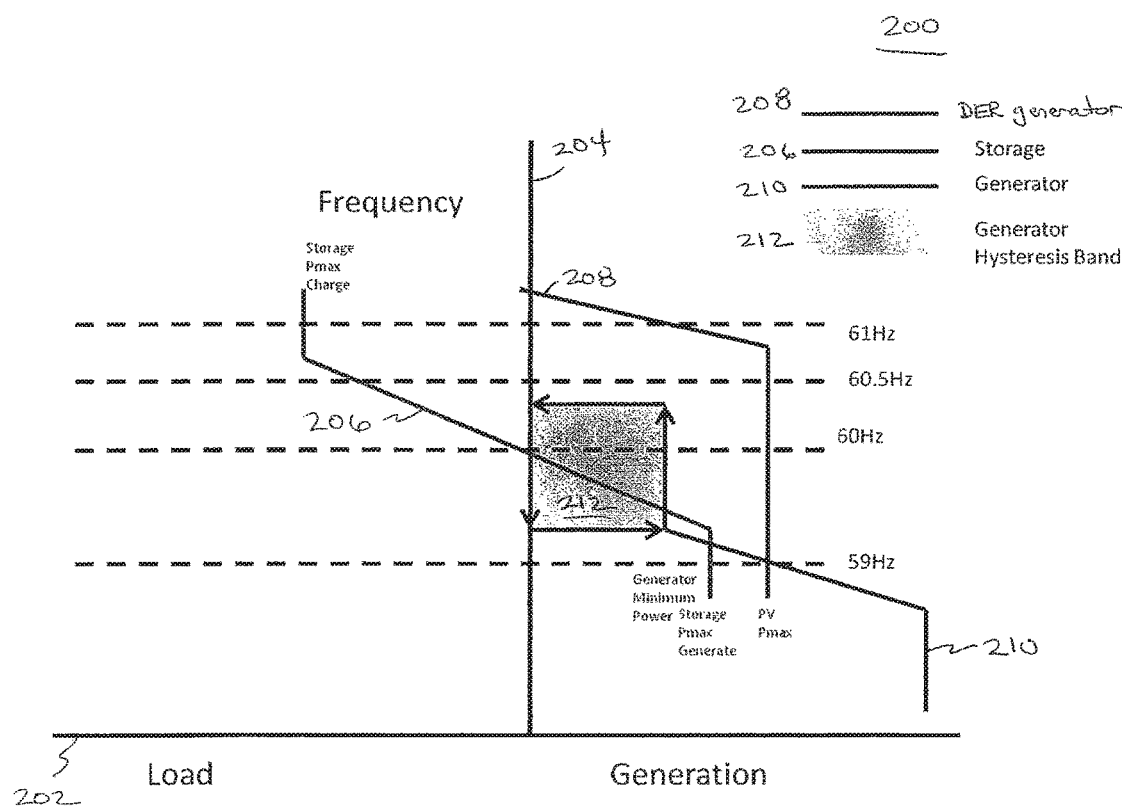
FIG. 2 is a frequency-watt graph comprising a plurality of droop curves in accordance with one or more embodiments of the present invention.

FIG. 2 is a frequency-watt graph 200 comprising a plurality of droop curves in accordance with one or more embodiments of the present invention. The frequency-watt graph 200 is based on a standard or classic volt-VAR-frequency-watt droop technique, where real power is a function of frequency only and reactive power is a function of voltage only. In such a droop technique, for frequency-watt control a simple Cartesian coordinate plane can be used to show the relationship between real power and frequency as depicted by the frequency-watt graph 200. Although the frequency-watt graph 200 pertains to those embodiments where a classic volt-VAR-frequency-watt droop technique is employed, in one or more other embodiments any other type of droop control which cross-couples watts, VARs, volts, and frequency using rotational transformation may be employed; for example, in other embodiments voltage and frequency may vary based on a complex relationship.

The frequency-watt graph 200 comprises a horizontal axis 202 and a vertical axis 204. Moving upward along the vertical axis 204 represents an increase in frequency. Moving to the left of the vertical axis 204 represents no generation and a decrease in loading, while moving to the right of the vertical axis 204 represents an increase in generation (and also an increase in loading).

The frequency-watt graph 200 further comprises a plurality of droop curves pertaining to the microgrid member resources described above. A storage droop curve 206 pertains to those microgrid member components that store energy (the AC battery 180 and one or more of the smart loads 118 that store energy and can deliver it back); a DER generator droop curve 208 corresponds to the DER generators (i.e., the DC sources 112/power conditioners 110); and a generator droop curve 210 corresponds to the generator 130. Although a single storage droop curve 206 is depicted in FIG. 2, in some embodiments different storage droop curves 206 may be employed for one or more of the microgrid member components that store energy. For example, different droop curves may be used for different battery chemistries depending on their round-trip efficiency and relative costs. Generally, when there are multiple storage droop curves 206 they fall between the DER generator droop curve 208 and the generator droop curve 210.

For the storage droop curve 206, the balance between energy storage and loading occurs along the vertical axis 204 at the nominal grid frequency, for example 60 Hz, as depicted in FIG. 2. Moving left of the vertical axis 204, as less and less load and thus less and less power is being drawn, charging of the storage components increases; as the loading of the local grid 132 is decreased, its increases. Moving right of the vertical axis 204, as loading increases, energy is drawn from the energy storage components. Additionally, the DER generators begin generation and increase their generation to a maximum point.

As shown by the droop curves 206, 208, and 210, the droop settings for the different types of microgrid member components are offset from one another to coordinate and optimize the use of the different resources. In particular, the DER generators are set with a higher frequency target than the storage components to prevent the DER generation from being curtailed unless the storage component charging has been maximized, thereby preventing available renewable resource energy from being wasted while there is capacity to store it. Similarly, the generator 130 is set with a lower frequency set point than the storage components to prevent the generator 130 from turning on until both the DER generators and the storage components are being fully utilized.

As depicted in FIG. 2, the generator droop curve 210 is a hysteretic droop curve having a higher shut-down frequency than its turn-on frequency. The difference between the shut-down frequency and the turn-on frequency is greater than the expected generator turn-on frequency jump resulting from the generator's minimum operating power in order to prevent oscillatory behavior in the generator 130. For example, one or more loads may be turned on (e.g., a hairdryer, a vacuum, and the like) such that sufficient power cannot be supplied by the DER generators and the storage resources. The generator 130 thus turns on and the power line experiences a frequency jump, where the magnitude of the frequency jump is based, in part, on the generator's minimum operating power. As a result of the hysteresis band 212 for the generator droop curve, the increased frequency remains within the hysteresis band 212 and the generator 130 remains on (e.g., on its minimum load). As more load begins being drawn, for example one or more additional appliances are turned on, the generator throttling begins and occurs over the throttling range of the generator.

The magnitude of the expected frequency jump can be calculated based on the minimum power of the generator and the aggregate droop response of the system, which can be measured or inferred based on knowing the droop gains of all the participating DERs. For example, for a generator with a minimum power of 1 kW on a system having two other DERs, one with a frequency-watt droop gain of 0.1 Hz/kW and another with a gain of 0.5 Hz/kW, the aggregate droop gain is 1/(1/0.1+1/0.5)=0.083 Hz/kW. In such a system, a jump of 0.083 Hz in frequency is expected when the generator turns on, and the hysteresis may be set to 0.2 Hz to allow sufficient margin. In general, as the system gets larger and larger the required hysteresis would become smaller and smaller since the generator turning on would have less effect on the overall system.

Figure 3:
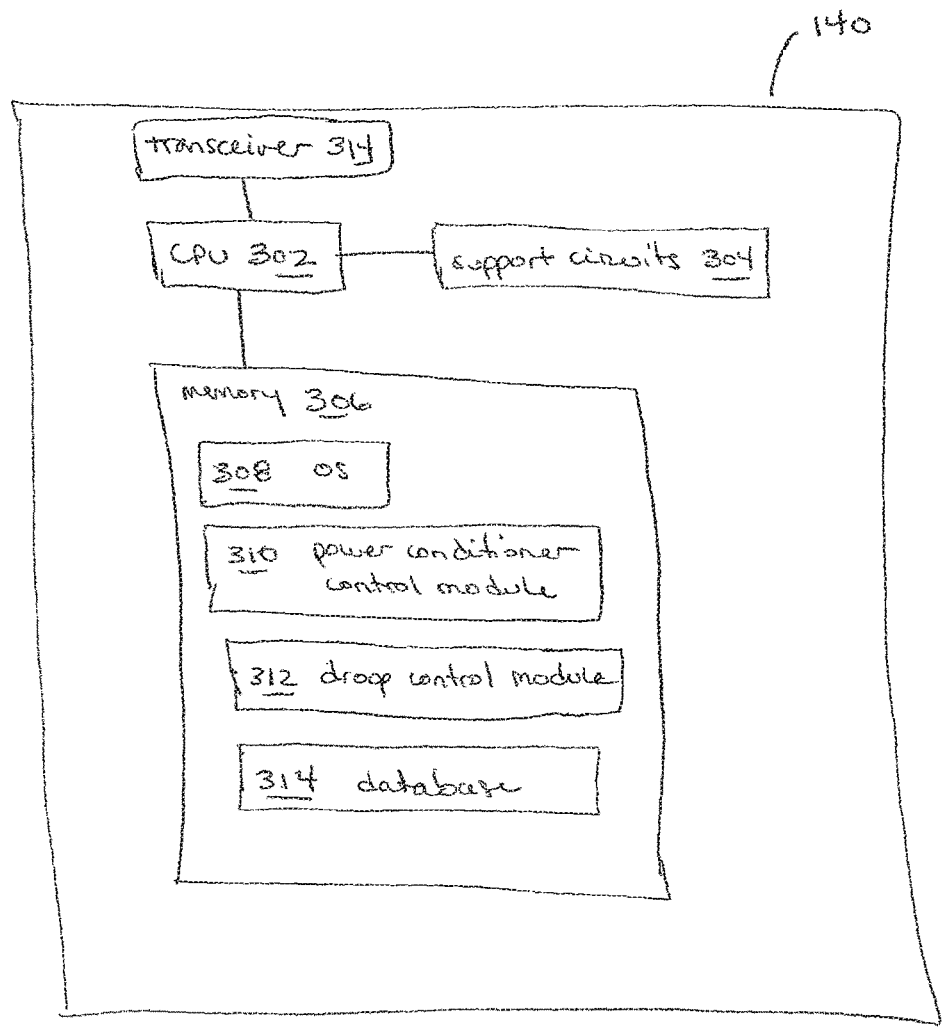
FIG. 3 is a block diagram of a power conditioner controller in accordance with one or more embodiments of the present invention.

FIG. 3 is a block diagram of a power conditioner controller 140 in accordance with one or more embodiments of the present invention. The power conditioner controller 140 comprises a transceiver 314, support circuits 304 and a memory 306, each coupled to a central processing unit (CPU) 302. The CPU 302 may comprise one or more conventionally available microprocessors or microcontrollers; alternatively, the CPU 302 may include one or more application specific integrated circuits (ASICs). The power conditioner controller 140 may be implemented using a general purpose computer that, when executing particular software, becomes a specific purpose computer for performing various embodiments of the present invention. In one or more embodiments, the CPU 302 may be a microcontroller comprising internal memory for storing controller firmware that, when executed, provides the controller functionality described herein.

The transceiver 314 may be coupled to the power conditioner's output lines for communicating with the DER controller 108 and/or other power conditioners 110 using power line communications (PLC). Additionally or alternatively, the transceiver 214 may communicate with the DER controller 108 and/or other power conditioners 110 using other type of wired communication techniques and/or wireless techniques.

The support circuits 304 are well known circuits used to promote functionality of the CPU 302. Such circuits include, but are not limited to, a cache, power supplies, clock circuits, buses, input/output (I/O) circuits, and the like.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS) 308, if necessary, of the power conditioner controller 140 that can be supported by the CPU capabilities. In some embodiments, the OS 308 may be one of a number of commercially available operating systems such as, but not limited to, LINUX, Real-Time Operating System (RTOS), and the like.

The memory 306 stores various forms of application software, such as a power conditioner control module 310 for controlling, when executed, power conversion by the power conditioner 110, and a droop control module 312 for employing, when executed, droop control techniques as described herein. The memory 306 additionally stores a database 314 for storing data related to the operation of the power conditioner 110 and/or the present invention, such as one or more droop curves described herein.

Figure 4:
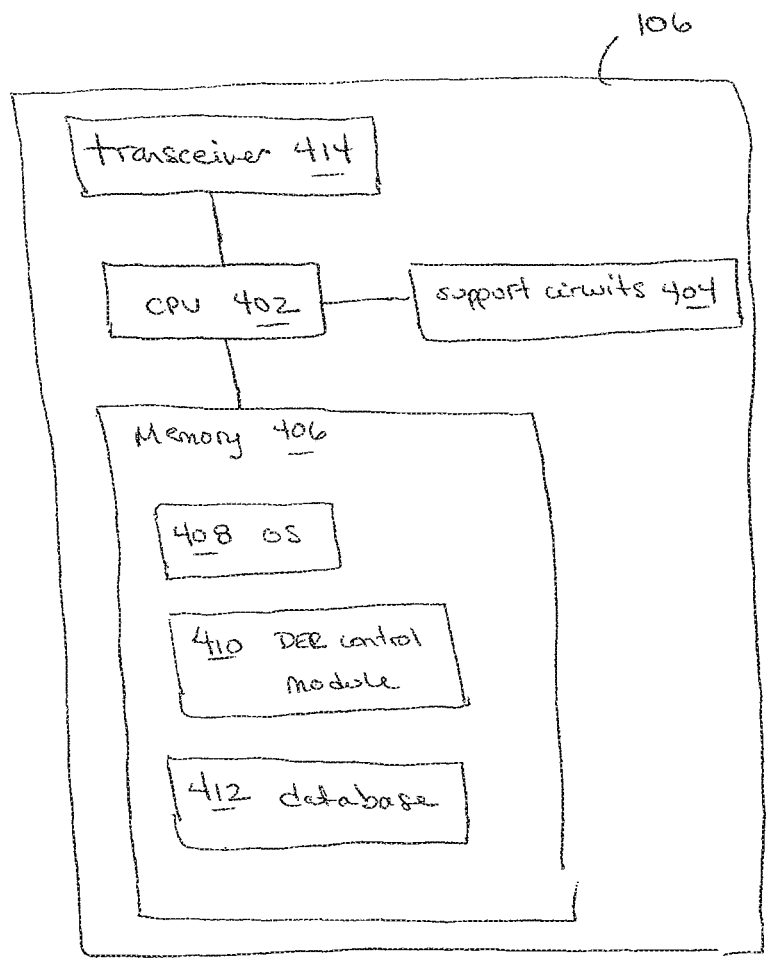
FIG. 4 is a block diagram of a DER controller in accordance with one or more embodiments of the present invention.

FIG. 4 is a block diagram of a DER controller 108 in accordance with one or more embodiments of the present invention. The DER controller 108 comprises a transceiver 414, support circuits 404 and a memory 406, each coupled to a central processing unit (CPU) 402. The CPU 402 may comprise one or more conventionally available microprocessors or microcontrollers; alternatively, the CPU 402 may include one or more application specific integrated circuits (ASICs). The DER controller 108 may be implemented using a general purpose computer that, when executing particular software, becomes a specific purpose computer for performing various embodiments of the present invention. In one or more embodiments, the CPU 402 may be a microcontroller comprising internal memory for storing controller firmware that, when executed, provides the controller functionality described herein.

The DER controller 108 generally communicates, via the transceiver 414, with the power conditioners 110 using power line communications (PLC), although additionally or alternatively the transceiver 414 may communicate with the power conditioners 110 using other types of wired and/or wireless communication techniques. In some embodiments, the DER controller 108 may further communicate via the transceiver 414 with other controllers within the microgrid and/or with a master controller (not shown).

The support circuits 404 are well known circuits used to promote functionality of the CPU 402. Such circuits include, but are not limited to, a cache, power supplies, clock circuits, buses, input/output (I/O) circuits, and the like.

The memory 406 may comprise random access memory, read only memory, removable disk memory, flash memory, and various combinations of these types of memory. The memory 406 is sometimes referred to as main memory and may, in part, be used as cache memory or buffer memory. The memory 406 generally stores the operating system (OS) 408, if necessary, of the power conditioner controller 140 that can be supported by the CPU capabilities. In some embodiments, the OS 408 may be one of a number of commercially available operating systems such as, but not limited to, LINUX, Real-Time Operating System (RTOS), and the like.

The memory 406 stores various forms of application software, such as a DER control module 410 for controlling operations pertaining to the DER 106 (e.g., collecting performance data for the power conditioners 110, generating control instructions for the power conditioners 110, and the like). The memory 406 additionally stores a database 412 for storing data related to the operation of the DER 106.

Figure 5:
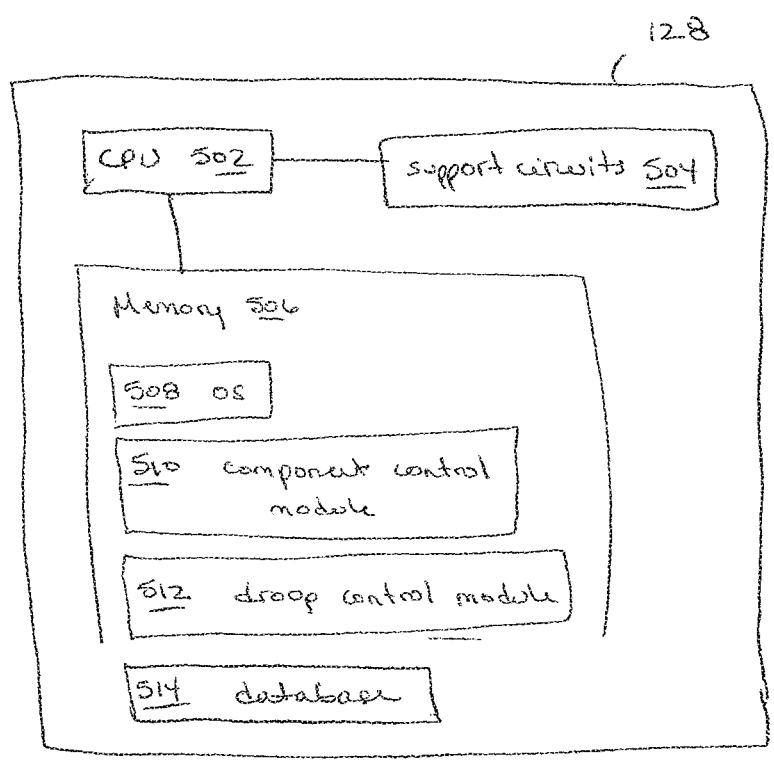
FIG. 5 is a block diagram of a component controller in accordance with one or more embodiments of the present invention.

FIG. 5 is a block diagram of a component controller 128 in accordance with one or more embodiments of the present invention. The component controller 128 comprises support circuits 504 and a memory 506, each coupled to a central processing unit (CPU) 502. The CPU 502 may comprise one or more conventionally available microprocessors or microcontrollers; alternatively, the CPU 502 may include one or more application specific integrated circuits (ASICs). The component controller 128 may be implemented using a general purpose computer that, when executing particular software, becomes a specific purpose computer for performing various embodiments of the present invention. In one or more embodiments, the CPU 502 may be a microcontroller comprising internal memory for storing controller firmware that, when executed, provides the controller functionality described herein.

The support circuits 504 are well known circuits used to promote functionality of the CPU 502. Such circuits include, but are not limited to, a cache, power supplies, clock circuits, buses, input/output (I/O) circuits, and the like.

The memory 506 may comprise random access memory, read only memory, removable disk memory, flash memory, and various combinations of these types of memory. The memory 506 is sometimes referred to as main memory and may, in part, be used as cache memory or buffer memory. The memory 506 generally stores the operating system (OS) 508, if necessary, of the component controller 128 that can be supported by the CPU capabilities. In some embodiments, the OS 508 may be one of a number of commercially available operating systems such as, but not limited to, LINUX, Real-Time Operating System (RTOS), and the like.

The memory 506 stores various forms of application software, such as a component control module 510 for controlling, when executed, one or more functions of the corresponding component, and a droop control module 512 for employing, when executed, droop control techniques as described herein. In one or more embodiments, the droop control module 512 may be the same as the droop control module 312. In certain other embodiments, the component controller 128 may be used in place of the power conditioner controller 140.

The memory 506 additionally stores a database 512, for example for storing data related to the operation of the corresponding component, such as one or more of the droop curves described herein.

When a microgrid member 152 is disconnected from the local grid 132 and/or the utility grid 104, the power conditioner controllers 140 and the component controllers 128 facilitate automatic control of the corresponding components. For example, the power conditioner control module 310 and the droop control module 312, when executed, facilitate automatic control of the corresponding power conditioner 110; e.g., the power conditioner control module 310 may monitor the power line frequency and/or voltage at the corresponding power conditioner 110 to ensure that the frequency and/or voltage stay within designated parameters as driven by the droop control module 312. In one or more embodiments, the droop control module 512 may be the same as the droop control module 312.

By using such localized droop control, each component can autonomously optimize its operation with respect to the microgrid member 152/overall microgrid 150. For example, for the generator 130, the component controller 128 may optimize the generation of power; for smart loads 118, the component controller 128 may optimize the consumption of energy (e.g., by controlling the energy consumed by individual loads either through throttling the flow or turning on and turning off various loads at certain times); and for smart loads 118 that are energy storage devices, the component controller 128 may optimize the energy flow into and out of the storage devices. In some embodiments, the droop control module 512 may be the same as the droop control module 312 previously described.

Figure 6:
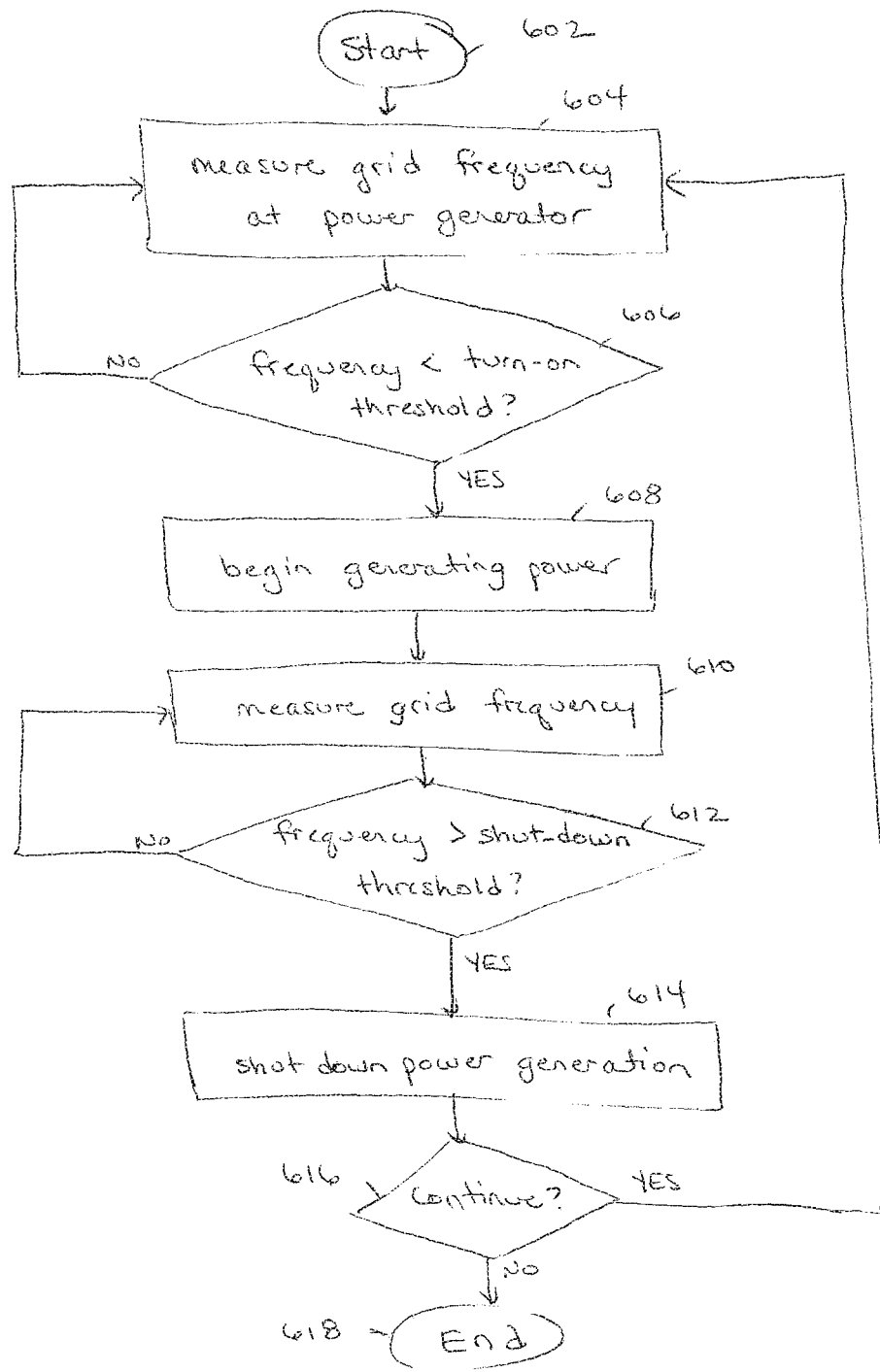
FIG. 6 is a flow diagram of a method for autonomous control of a microgrid generator in accordance with one or more embodiments of the present invention.

FIG. 6 is a flow diagram of a method 600 for autonomous control of a microgrid generator in accordance with one or more embodiments of the present invention. In some embodiments, the method 600 is an implementation of the droop control module 512 previously described. In some embodiments, a computer readable medium comprises a program that, when executed by a processor, performs at least a portion of the method 600 that is described in detail below.

In some embodiments, such as the embodiment described below, the microgrid generator is a conventional generator that is part of a microgrid, such as the generator 130 of the microgrid member 152-1/microgrid 150-1 previously described, that is operating in an islanded mode. The components of the microgrid are electrically interconnected by an AC transmission grid, which may be referred to as a local grid, a microgrid grid, or a microgrid transmission line.

The method 600 begins at step 602 and proceeds to step 604. At step 604, the frequency of the microgrid transmission line measured at (or proximate) the generator is obtained. Generally, the generator comprises one or more components for periodically measuring the grid frequency, such as a phase lock loop (PLL), although in some alternative embodiments the frequency may be periodically measured by a component external to the generator. In some other embodiments, one or more other parameters may be measured as part of providing autonomous control of the generator, such as the grid voltage at or proximate the generator. Although the hysteretic method described herein may be applied to any form of droop, whether frequency-watt, voltage-var, or cross-coupled droop (where frequency and voltage both have an effect on watts and var), applying the technique to voltage-var forms of droop may be more complex as the minimum VAR of a generator isn't always clearly known.

The method 600 proceeds to step 606, where a determination is made whether the grid frequency is below a generator turn-on threshold. In some embodiments, the turn-on threshold may be set at a lower value than that of other components within the microgrid, such as storage assets, DER generators, and the like, such that the generator doesn't turn on until both DER generators and storage assets are both being fully used.

If the result of the determination at step 606 is no, that the grid frequency is not less than the turn-on threshold, the method 600 returns to step 604. If the result of the determination at step 606 is yes, that the grid frequency is less than the turn-on threshold, the method 600 proceeds to step 608.

At step 608, the generator turns on to begin power generation. At step 610, the grid frequency continues being obtained (e.g., measured directly or measured values are obtained). At step 612, a determination is made whether the grid frequency has exceeded a generator shut-down threshold. The shut-down threshold is such that the difference between the shut-down frequency and the turn-on frequency is greater than the expected frequency jump that occurs when the generator is turned on (i.e., the frequency jump that results from the minimum operating power of the generator). In some embodiments, the turn-on and shut-down thresholds may be set at 59.2 Hz and 60.3 Hz, respectively. If the result of the determination at step 612 that no, that the grid frequency is not greater than the shut-down frequency, the method 600 returns to step 610. If the result of the determination at step 612 is yes, that the grid frequency is greater than the shut-down frequency, the method 600 proceeds to step 614.

At step 614, power generation by the generator is shut down. The method 600 proceeds step 616, where a determination is made whether to continue operation. If the result of the determination at step 616 is yes, to continue, the method 600 returns to step 604. If the result of the determination at step 616 is no, to not continue operation, the method 600 proceeds to step 618 where it ends.

While the foregoing is directed to embodiments of the present invention, other and further embodiments of the invention may be devised without departing from the basic scope thereof and the scope thereof is determined by the claims that follow.

The invention claimed is:

1. A method for autonomously operating a microgrid power generator comprising:
    obtaining a first measurement of at least one grid parameter of a microgrid transmission line coupled to a power generator in a microgrid;
    comparing the first measurement to a turn-on threshold;
    initiating, when the first measurement is less than the turn-on threshold, power generation by the power generator;
    obtaining, after initiation of the power generation, a second measurement of the at least one grid parameter of the microgrid transmission line;
    comparing the second measurement to a shut-down threshold that is greater than the turn-on threshold; and
    stopping, when the second measurement exceeds the shut-down threshold, the power generation by the power generator.

2. The method of claim 1, wherein the at least one grid parameter is the frequency of the microgrid transmission line.

3. The method of claim 2, wherein the shut-down threshold exceeds the turn-on threshold by an amount greater than the magnitude of an expected frequency change to the frequency of the microgrid that results from initiating the power generation.

4. The method of claim 3, where the magnitude of the expected frequency change is based on a minimum operating power of the power generator.

5. The method of claim 2, wherein the turn-on threshold is less than a frequency set point for activating energy retrieval from at least one storage asset of the microgrid.

6. The method of claim 2, wherein the turn-on threshold is less than a frequency set point for activating power generation by a distributed energy resource (DER) of the microgrid.

7. Apparatus for autonomously operating a microgrid power generator comprising:
    a generator controller for:
        obtaining a first measurement of at least one grid parameter of a microgrid transmission line coupled to a power generator in a microgrid;
        comparing the first measurement to a turn-on threshold;
        initiating, when the first measurement is less than the turn-on threshold, power generation by the power generator;
        obtaining, after initiation of the power generation, a second measurement of the at least one grid parameter of the microgrid transmission line;
        comparing the second measurement to a shut-down threshold that is greater than the turn-on threshold; and
        stopping, when the second measurement exceeds the shut-down threshold, the power generation by the power generator.

8. The apparatus of claim 7, wherein the at least one grid parameter is the frequency of the microgrid transmission line.

9. The apparatus of claim 8, wherein the shut-down threshold exceeds the turn-on threshold by an amount greater than the magnitude of an expected frequency change to the frequency of the microgrid that results from initiating the power generation.

10. The apparatus of claim 9, where the magnitude of the expected frequency change is based on a minimum operating power of the power generator.

11. The apparatus of claim 8, wherein the turn-on threshold is less than a frequency set point for activating energy retrieval from at least one storage asset of the microgrid.

12. The apparatus of claim 11, wherein the at least one storage asset is an AC battery comprising a bidirectional DC-AC inverter.

13. The apparatus of claim 8, wherein the turn-on threshold is less than a frequency set point for activating power generation by a distributed energy resource (DER) of the microgrid.

14. The apparatus of claim 13, wherein the DER comprises a plurality of photovoltaic (PV) modules coupled to a plurality of DC-AC inverters.

15. A non-transitory computer readable medium comprising a program that, when executed by a processor, performs a method for operating a microgrid power generator, the method comprising:
    obtaining a first measurement of at least one grid parameter of a microgrid transmission line coupled to a power generator in a microgrid;
    comparing the first measurement to a turn-on threshold;
    initiating, when the first measurement is less than the turn-on threshold, power generation by the power generator;
    obtaining, after initiation of the power generation, a second measurement of the at least one grid parameter of the microgrid transmission line;
    comparing the second measurement to a shut-down threshold that is greater than the turn-on threshold; and stopping, when the second measurement exceeds the shut-down threshold, the power generation by the power generator.

16. The non-transitory computer readable medium of claim 15, wherein the at least one grid parameter is the frequency of the microgrid transmission line.

17. The non-transitory computer readable medium of claim 16, wherein the shut-down threshold exceeds the turn-on threshold by an amount greater than the magnitude of an expected frequency change to the frequency of the microgrid that results from initiating the power generation.

18. The non-transitory computer readable medium of claim 17, where the magnitude of the expected frequency change is based on a minimum operating power of the power generator.

19. The non-transitory computer readable medium of claim 16, wherein the turn-on threshold is less than a frequency set point for activating energy retrieval from at least one storage asset of the microgrid.

20. The non-transitory computer readable medium of claim 16, wherein the turn-on threshold is less than a frequency set point for activating power generation by a distributed energy resource (DER) of the microgrid.

* * * * *